UNITED STATES PATENT OFFICE.

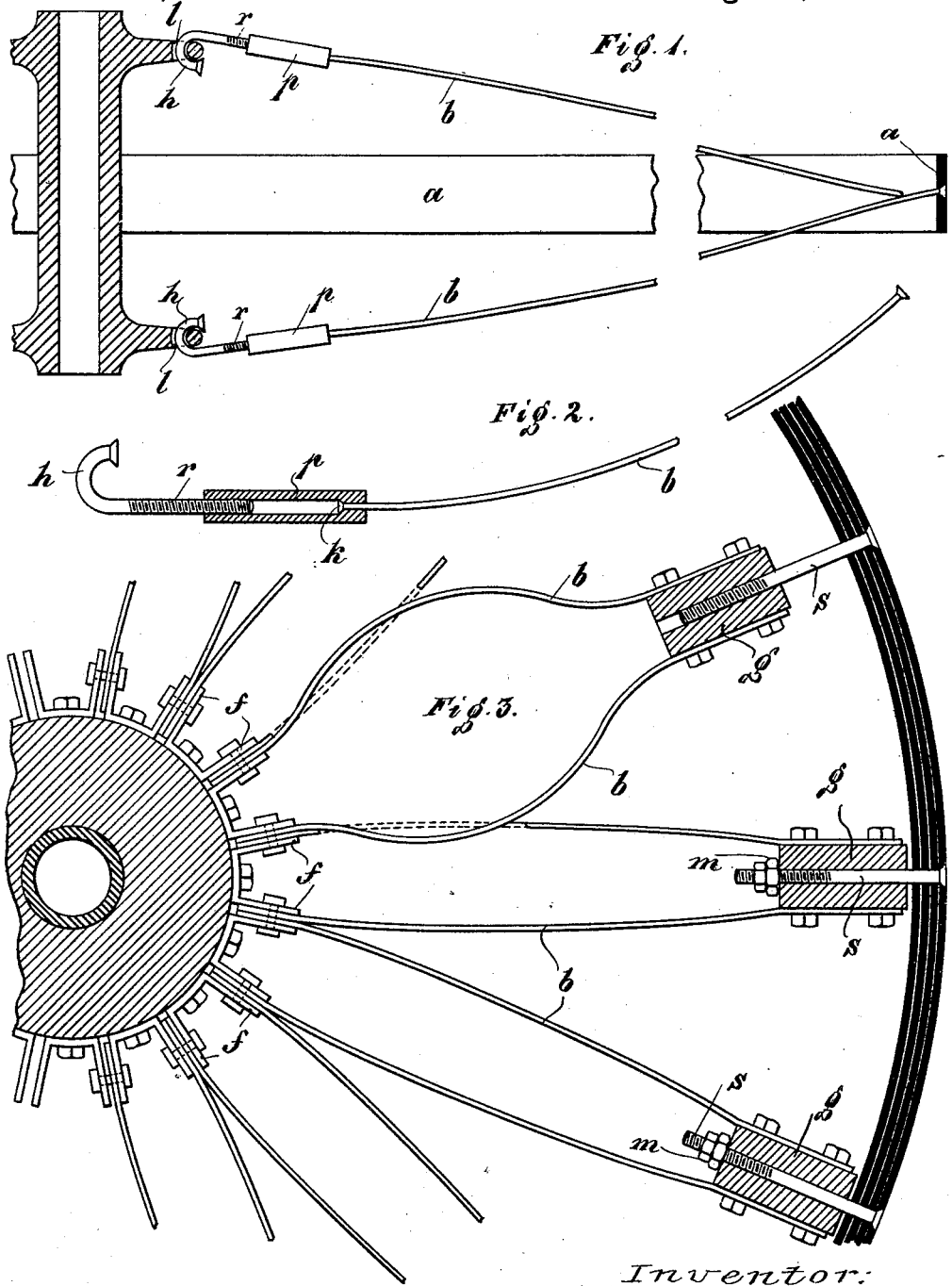

JULIUS VON OLIVIER, OF MUNICH, GERMANY.

ELASTIC WHEEL.

SPECIFICATION forming part of Letters Patent No. 480,738, dated August 16, 1892.

Application filed March 28, 1892. Serial No. 426,756. (No model.)

*To all whom it may concern:*

Be it known that I, JULIUS VON OLIVIER, a citizen of the Kingdom of Bavaria, and a resident of Munich, Bavaria, Germany, have invented certain new and useful Improvements in Elastic Wheels, of which the following is a specification.

This invention relates to elastic wheels; and it consists in the construction hereinafter described and set forth, whereby a light durable spring-wheel is provided that will subserve all the purposes desired.

In the accompanying drawings, forming part of this specification, Figure 1 is a transverse section of a wheel embodying my improvements. Fig. 2 is a detail sectional view illustrating the manner of adjusting the spokes, and Fig. 3 is a longitudinal section through so much of a wheel as is necessary to more fully illustrate my invention.

Instead of providing the wheel with a series of fellies and a tire, as ordinarily, I form the outer portion thereof from a band of steel or other spring material, the desired strength being obtained by superimposing the band upon itself, as shown most clearly in Fig. 3. The terminal portions of the band are suitably welded or riveted.

As shown in Fig. 1, a hub is provided with a double series of projections having eyes $l$, through which pass the hook $h$ of screw-rods $r$, engaged by a swivel coupling-sleeve $p$, carried on the inner end of the spoke $b$, the enlarged head $k$ of which is seated in the coupling-sleeve. The wheel can be made rigid and strong by so adjusting the swivel-couplings $p$ as to draw the spoke $b$ absolutely taut.

In use the wheel will be exceedingly durable and serviceable in that its point of peripheral bearing will yield to a limited extent, thus avoiding shocks and concussions, bounding of the wheel, and severe strain of the parts.

In lieu of the construction described, that shown in Fig. 3 may be employed, wherein the spokes are represented as being permanently bolted to a block $g$, having a central opening through which passes the shank of a bolt S, the head of which engages the tire and having its inner threaded portion projecting beyond the block for the engagement of a nut, by means of which the spokes $b$ can be drawn absolutely rigid.

Having now particularly described and ascertained the nature of my said invention and in what manner the same is to be performed, what I claim is—

1. In a wheel, the combination of the spokes and the outer portion consisting of a continuous band superimposed upon itself in layers, substantially as described.

2. In combination, the hub, the rim, the block $g$, the two spokes $b\ b$, secured to said block, one on each side, and secured, also, to the hub, the bolt S, passing through the said block and connected with the rim, and means for adjusting the bolt, substantially as described.

In testimony that I claim the foregoing as my invention I have signed my name in presence of two subscribing witnesses.

JULIUS VON OLIVIER.

Witnesses:
ALBERT WEICKMAN,
KARL MAYER.